United States Patent [19]

Lutz

[11] Patent Number: 4,857,605
[45] Date of Patent: Aug. 15, 1989

[54] POLYMER BLEND

[75] Inventor: Robert G. Lutz, Santa Rosa, Calif.

[73] Assignee: Shell Oil Company, Houston, Tex.

[21] Appl. No.: 147,401

[22] Filed: Jan. 25, 1988

[51] Int. Cl.$^4$ .................... C08L 67/02; C08L 67/04; C08L 65/00

[52] U.S. Cl. .................................. 525/445; 525/450; 525/539

[58] Field of Search ................. 525/445, 450, 539

[56] References Cited

U.S. PATENT DOCUMENTS

| 2,495,286 | 1/1950 | Brubaker | 260/63 |
| 3,694,412 | 9/1972 | Nozaki | 260/63 |
| 3,780,140 | 12/1973 | Hammer | 260/884 |
| 4,076,911 | 2/1978 | Fenton | 526/120 |

FOREIGN PATENT DOCUMENTS

| 121965 | 10/1984 | European Pat. Off. |
| 181014 | 5/1986 | European Pat. Off. |
| 222454 | 5/1987 | European Pat. Off. |
| 1081304 | 3/1965 | United Kingdom |

Primary Examiner—Patricia Short
Attorney, Agent, or Firm—Dean F. Vance

[57] ABSTRACT

The invention is a polymeric composition comprising a blend of a linear alternating polymer of carbon monoxide and at least one ethylenically unsaturated hydrocarbon with a thermoplastic polyester.

20 Claims, No Drawings

POLYMER BLEND

FIELD OF THE INVENTION

This invention relates to the class of linear alternating polymers of carbon monoxide and at least one ethylenically unsaturated hydrocarbon and to blend compositions of the polymers. More particularly, this invention relates to blend compositions of linear alternating polymers of carbon monoxide and at least one ethylenically unsaturated hydrocarbon with a thermoplastic polyester. In addition, the invention relates to shaped articles produced from such blends.

BACKGROUND OF THE INVENTION

Polymers of carbon monoxide and ethylenically unsaturated hydrocarbons, commonly called polyketones, have been known and available in limited quantities for many years. For example, polymers of ethylene or ethylene-propylene which contain small quantities of carbon monoxide are disclosed in U.S. Pat. No. 2,495,286, prepared using free radical catalysts. British Pat. No. 1,081,304 discloses polymers containing higher concentrations of carbon monoxide prepared using alkylphosphine complexes of palladium salts as catalysts. A special class of linear polyketones is disclosed in U.S. Pat. No. 3,694,412, wherein the monomer units of carbon monoxide and ethylenically unsaturated hydrocarbons occur in alternating order.

High molecular weight linear alternating polyketones are of considerable interest because they exhibit good physical properties. These polymers can be represented by the general formula

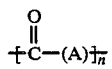

where A is the moiety obtained by the polymerization of an ethylenically unsaturated hydrocarbon through the ethylenic unsaturation. A general process for preparing such linear alternating polymers is disclosed, for example, in published European Patent Application Nos. 121,965 and 181,014. The process comprises contacting the monomers in the presence of a catalyst obtained from a compound of palladium, cobalt or nickel, the anion of a non-hydrohalogenic acid having a pKa less than about 2, and a bidentate ligand of phosphorus, arsenic or antimony. The resulting linear alternating polymes are generally high molecular weight engineering thermoplastics that possess a balance of properties comprising strength, stiffness, impact resistance, and dimensional stability. Such thermoplastics are useful as structural materials and in the production of articles for food and drink containers. Engineering thermoplastics are especially attractive as replacements for metals because of the reduction in weight that can often be achieved as, for example, in automotive applications.

For a particular application, a single thermoplastic, such as high molecular weight linear alternating polyketone, may not offer a particular combination of desired properties. One particularly appealing method of obtaining such advantage is through blending together two or more thermoplastic polymers to give a material with a different combination of properties. Although polyketones have many desirable properties it would be advantageous to have polymeric compositions exhibiting modified properties.

SUMMARY OF THE INVENTION

The invention relates to a polymeric composition comprising a blend of a linear alternating polyketone with other polymeric materials. In particular, the invention is a polymeric composition comprising a blend of a linear alternating polymer of carbon monoxide and at least one ethylenically unsaturated hydrocarbon with a thermoplastic polyester.

DESCRIPTION OF THE INVENTION

The polymers which are incorporated in the blends of the invention are those linear alternating polyketones produced from carbon monoxide and at least one ethylenically unsaturated hydrocarbon. Suitable ethylenically unsaturated hydrocarbons for production of polyketones through polymerization with carbon monoxide are hydrocarbons of from 2 to 20 carbon atoms inclusive, preferably of up to 10 carbon atoms inclusive, and are aliphatic including ethylene and other alpha-olefins such as propylene, butene-1, isobutylene, octene-1 and dodecene-1, or are arylaliphatic containing an aryl substituent on an otherwise aliphatic molecule, particularly an alpha-olefin containing an aryl substituent on a carbon atom of the ethylenic unsaturation. Illustrative of this latter class are styrene, p-methylstyrene, m-ethylstyrene and p-propylstyrene. Preferred polyketone polymers for use in the compositions of the invention are copolymers of carbon monoxide and ethylene or terpolymers of carbon monoxide, ethylene and a second alpha-olefin of 3 or more carbon atoms, particularly propylene.

Of particular interest are the polyketones of molecular weight from about 1000 to about 200,000 especially those polymers of molecular weight from about 10,000 to about 50,000 and containing substantially equimolar quantities of carbon monoxide and ethylenically unsaturated hydrocarbon.

A method of producing polyketone polymers which is now becoming conventional is to contact the carbon monoxide and the ethylenically unsaturated hydrocarbon(s) under polymerization conditions in the presence of a catalyst formed from a metal compound of palladium, cobalt or nickel, an anion of a non-hydrohalogenic acid having a pKa less than about 6, preferably less than about 2, and certain bidentate ligands of nitrogen or of phosphorus, arsenic or antimony. Although the scope of the polymerization process is extensive, for purposes of illustration of a preferred method of producing the polyketone polymer, the metal compound is palladium acetate, the anion is the anion of trifluoroacetic acid or para-toluenesulfonic acid and the bidentate ligand is selected from 1,3-bis(diphenylphosphino)propane and 1,3-bis[di(2-methoxyphenyl)phosphino]propane.

Polymerization is typically carried out at elevated temperature and pressure in the gaseous phase in the substantial absence of reaction diluent or in the liquid phase in the presence of a reaction diluent such as a lower alkanol, e.g., methanol or ethanol. Suitable reaction temperatures are from about 20° C. to about 150° C. with preferred temperatures being from about 50° C. to about 125° C. The reaction pressure will typically be from about 1 bar to about 200 bar, preferably from about 10 bar to about 100 bar. The reactants and catalyst are contacted by conventional methods such as shaking or stirring and subsequent to reaction the polymer product is recovered as by filtration or decantation. The polymer product will, on occasion, contain metal or other residues of the catalyst which are removed, if desired, by treatment of the polymer product with a complexing agent or solvent which is selective for the residues. Production of this class of polymers is illustrated, for example, by copending U.S. patent application Ser. No. 930,468, filed Nov. 14, 1986.

The physical properties of the polymer and the compositions of the invention will be in part determined by the molecular weight of the polymer, whether the polymer is a copolymer or terpolymer and which unsaturated hydrocarbons have been employed in its production. Suitable linear alternating polyketones for use in the invention have limiting viscosity numbers (LVN) as measured in m-cresol at 60° C., using a standard capillary viscosity measuring device, in the range of about 0.5 to about 10 LVN, more preferably from about 0.8 to about 4 LVN and most preferably from about 1.1 to about 2.5. Typical melting points of the polyketone polymers are from about 175° C. to about 300°, more frequently from about 210° C. to about 260° C. The structure of the polymer in the preferred modifications is that of a linear alternating polymer of units of carbon monoxide and ethylene and carbon monoxide and any second ethylenically unsaturated hydrocarbon if present. The preferred polyketone polymers contain substantially one carbon monoxide moiety for each moiety of unsaturated hydrocarbon. When terpolymers are produced from carbon monoxide, ethylene and a second ethylenically unsaturated hydrocarbon, i.e., an alpha-olefin of at least 3 carbon atoms such as propylene, there will be at least about 2 units incorporating a moiety of ethylene per unit incorporating a moiety of the second ethylenically unsaturated hydrocarbon. Preferably, there are from about 10 to about 100 units incorporating a moiety of ethylene per unit incorporating a moiety of the second ethylenically unsaturated hydrocarbon. The preferred class of polyketone polymers is therefore characterized by a polymer chain of the formula

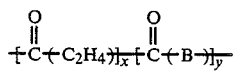  I wherein B is the moiety obtained by the polymerization of the second ethylenically unsaturated hydrocarbon of at least 3 carbon atoms through the ethylenic unsaturation. By way of further illustration, when the second ethylenically unsaturated hydrocarbon is propylene, the B moiety will be

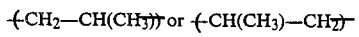

depending upon the stereochemistry of the polymerization. The polyketone terpolymers of the invention may contain body types of B moiety randomly occurring along the polymer chain. The

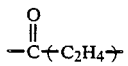

units and the

units will also occur randomly throughout the polymer chain although the ratio of y:x in the above formula I will be no more than about 0.5. In the modification of the invention which employs compolymers of carbon monoxide and ethylene without the presence of a second ethylenically unsaturated hydrocarbon, the polymers are represented by the above formula I wherein y=0. When y is other than 0, i.e. terpolymers are employed, ratios of y:x from about 0.01 to about 0.1 are preferred.

The linear alternating polyketones described by the above formula I will have end groups or "caps" which depend upon the particular components present during polymerization and whether and how the polymer is processed during any subsequent purification. The precise nature of such end groups or "caps" is not critical with regard to overall properties of the polymer, however, and the polymeric polyketones are fairly depicted through use of the polymer chain as depicted above.

The thermoplastic polyesters employed in the instant invention include polyesters having a recurring ester linkage in the molecule, for example, polylactones, and polyesters having a structure formed by polycondensation of a dicarboxylic acid with a glycol, for example, polyalkylene arylates. The polyesters have a generally crystalline structure, a melting point over 120° C., and are thermoplastic as opposed to thermosetting. The number average molecular weight of the polyesters is generally between 5000 to 100,000 and preferably 10,000 to 50,000.

One particularly useful group of polyesters are those thermoplastic polyesters having a structure formed by polycondensation of a dicarboxylic acid with a glycol. These polyesters may be prepared according to methods well known in the art such as by direct esterification or ester exchange reaction of a dicarboxylic acid or the lower alkyl ester, acid halide, or anhydride derivatives thereof with a glycol.

Among the dicarboxylic acids suitable for preparing polyesters useful in the present invention are those having from 2 to about 25 carbon atoms inclusive, preferably of up to 15 carbon atoms inclusive. The dicarboxylic acids may be aliphatic containing hydrocarbyl groups such as alkylene, alkylidene, cycloalkylene, and cycloalkylidene. The hydrocarbyl groups may contain unsaturation as in carbon-carbon multiple bonds and may be substituted such as an arylaliphatic containing an aryl substituent on an otherwise aliphatic molecule. Examples of suitable aliphatic dicarboxylic acids are oxalic acid, malonic acid, succinic acid, glutaric acid, adipic acid, suberic acid, azelaic acid and sebacic acid. The dicarboxylic acids may also be aromatic having at least one aromatic ring, preferably up to two aromatic rings, and the aromatic rings may contain hydrocarbyl substituents. Where the aromatic dicarboxylic acid contains more than one aromatic ring, the rings may be connected by carbon-carbon bonds, by hydrocarbyl bridging groups such as alkylene or alkylidene groups, or by other bridging groups such as oxo, thio and sulfone. Examples of suitable aromatic dicarboxylic acids are terephthalic acid, isophthalic acid, orthophthalic acid, 2,6-naphthalenic dicarboxylic acid, 2,7-naphthalenic dicarboxylic acid 1,5 naphthalenic dicarboxylic acid, 2,5 naphthalenic dicarboxylic acid, 4,4′biphenyldicarboxylic acid, 4,4′dicarboxydiphenylsulfone, 4,4′dicarboxydiphenylmethane, 4,4′-dicarboxydiphenylpropane, and 4,4′-dicarboxydiphenyloctane. Also suitable for use in the invention are dicarboxylic acids having both an aliphatic carboxylic acid moiety and an aromatic carboxyic acid moiety wherein the two acid moieties are connected by carbon-carbon bonds, by hydrocarbyl bridging groups such as alkylene or alkylidene groups, or by other bridging groups such as an oxo group. Examples of such suitable dicarboxylic acids are 4-carboxyphenylacetic acid, 4-carboxyphenoxyacetic acid, 4-carboxyphenoxypropionic acid, 4-carboxyphenoxybutyric acid, 4-carboxyphenoxyvaleric acid, 4-carboxyphenoxyhexanoic acid and β-(2-alkyl-4-carboxyphenoxy)propionic acids. Mixtures of dicarboxylic acids can also be employed. Terephthalic acid is particularly preferred.

The glycols suitable for preparing the polyesters useful in the invention include polyhydric alcohols of 2 to about 12 carbon atoms, preferably dihydric alcohols (diols) such as alkylene glycols and aromatic glycols and dihydroxy ethers. Examples of suitable alkylene glycols are the straight chain alkylene glycols ethylene glycol, 1,3-propylene glycol, 1,4-butylene glycol, 1,6-hexylene glycol, 2-methyl-1,3-propanediol, 1,10-decamethylene glycol, and 1,12-dodecamethylene glycol. Other suitable alkylene glycols are alicyclic diols such as 1,4-cyclohexane dimethanol. Aromatic glycols can be substituted in whole or in part. Suitable aromatic glycols include aromatic dihydroxy compounds such as p-xylylene glycol, pyrocatechol, resorcinol, hydroquinone, and alkyl-substituted derivatives of these compounds. Suitable dihydroxy ethers include diethylene glycol and triethylene glycols. Preferred glycols are the straight chain alkylene glycols, more preferred are the straight chain alkylene glycols having 2 to 4 carbon atoms.

A preferred group of these polyesters are the poly(alkylene arylates), in particular the poly(alkylene terephthalates) such as poly(ethylene terephthalate), poly(propylene terephthalate) and poly(butylene terephthalate).

A much preferred polyester is poly(butylene terephthalate). Poly(butylene terephthalate), a crystalline copolymer, may be formed by the polycondensation of 1,4-butylene glycol and dimethylterephthalate or terephthalic acid, and has the generalized formula:

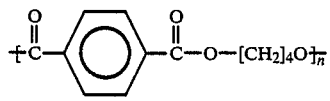

where n varies from 70 to 140. The molecular weight of the poly(butylene terephthalate) typically varies from about 20,000 to about 25,000. A suitable process for manufacturing the polymer is disclosed in British Pat. No. 1,305,130, which is incorporated here by reference.

Commercially available poly(butylene terephthalate) is available from General Electric under the tradename VALOX ® thermoplastic polyester. Other commercial polymers include CELANEX ® from Celenese, TENITE ® from Eastman Kodak, and VITUF ® from Goodyear Chemical. Another commercially available polyester is ARDEL ® polyarylate available from Amoco, having repeating units of the formulae

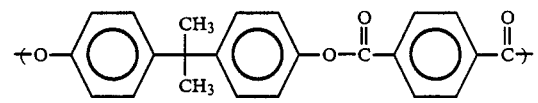

and

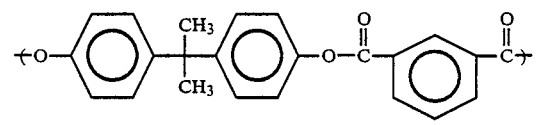

and

Another valuable group of thermoplastic polyesters which may be used in the present invention are polylactones. Polylactones having recurring ester structural units such as those obtained by ring opening polymerization of a cyclic lactone. Examples of suitable polylactones are poly(pivalolactone), poly(β-propiolactone) and poly(ε-caprolactone).

Polypivalolactone is a linear polymer having recurring ester structural units mainly of the formula:

i.e., units derived from pivalolactone. Preferably the polyester is a pivalolactone homopolymer. Also included, however, are the copolymers of pivalolactone with not more than 50 mole percent, preferably not more than 10 mole percent of other beta-propiolactones, such as beta-propiolactone, alpha,alpha-diethyl-beta-propiolactone and alpha-methyl-alpha-ethyl-beta-propiolactone. The term "beta-propiolactones" refers to beta-propiolactone (2-oxoetanone) and to derivatives thereof which carry no substituents at the beta-carbon atom of the lactone ring. Preferred beta-propiolactones are those containing a tertiary or quaternary carbon atom in the alpha position relative to the carbonyl group. Especially preferred are the alpha,alpha-dialkyl-beta-propiolactones wherein each of the alkyl groups independently has from one to four carbon atoms. Examples of useful monomers are: alpha-ethyl-alpha-methyl-beta-propiolactone, alpha-methyl-alpha-isopropyl-beta-propiolactone, alpha-ethyl-alpha-n-butyl-beta-propiolactone, alpha-chloromethyl-alpha-methyl-beta-propiolactone, alpha,alpha-bis(chloromethyl)-beta-propiolactone, and alpha,alpha-dimethyl-beta-propiolactone (pivalolactone). See generally U.S. Pat. Nos. 3,259,607; 3,299,171; and 3,579,489 which are incorporated here by reference. These polypivalolactones have a molecular weight in excess of 20,000 and a melting point in excess of 120° C.

Another useful polyester which may be obtained from a cyclic lactone is polycaprolactone. Typical poly(ε-caprolactones) are substantially linear polymers in which the repeating unit is

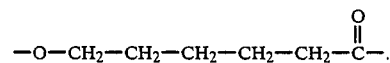

These polymers have similar properties to the polypivalolactones and may be prepared by a similar polymerization mechanism. See generally U.S. Pat. No. 3,259,607.

The relative proportions of the two polymer components of the blend can be varied over a wide range. The precise percentage of the thermoplastic polyester to be employed is not critical and percentages from about 1% by weight to about 80% by weight of the polyester, based on the total blend, are satisfactory. Preferably the blends of the invention are predominantly the polyketone with a lesser quantity of the polyester. The use of from about 2% by weight to about 40% by weight of the polyester, based on the total blend, is preferred, from about 5% by weight to about 25% by weight more preferred.

The method of producing the blend of polyketone and thermoplastic polyester is not material so long as an intimate blend of the two components is produced without undue degradation of the blend or its components. In one modification, the polymer components of the blend in finely divided form are dry mixed and converted to a blend through application of elevated temperature and pressure. In an alternate modification, the polymer components are co-extruded to produce the blend as an extrudate. The polymer components are also blended in a mixing device which exhibits high shear.

The polyketone/polyester blends of the invention have properties different from those of the polyketone polymer alone or those of the polyester polymer alone. The blends of the invention may also include conventional additives such as antioxidants and stabilizers, fillers and fire retardant materials, mold release agents and other materials designed to increase the processability of the polymer or improve the properties of the resulting blend. Such additives are added by conventional methods prior to, together with or subsequent to the blending of the polyketone and the polycarbonate.

The polymer blends according to the invention can be processed by means of the usual techniques into, among other things, films, sheets, plates, fibers and molded objects. The blends have use and utility as thermoplastics for fibers, films, injection molding, compression molding or blowing applications. The blends are suitable for many applications, such as in the auto industry, for the manufacture of cables and for a variety of applications in the domestic sphere.

To illustrate the instant invention, the following illustrative embodiments are given. It is to be understood, however, that the embodiments are given for the purpose of illustration only and the invention is not to be regarded as limited to any of the specific materials or conditions used in the specific embodiments.

ILLUSTRATIVE EMBODIMENT I

A linear alternating terpolymer of carbon monoxide, ethylene and propylene was produced in the presence of a catalyst composition formed from palladium acetate, the anion of trifluoroacetic acid and 1,3-bis(diphenylphosphino)propane. The melting point of the linear terpolymer was 221° C. and it had an LVN of 1.2 measured at 60° in m-cresol.

ILLUSTRATIVE EMBODIMENT II

Three blends of the terpolymer of Illustrative Embodiment I were prepared with about 10% by weight of polybutylene terephthalate, polyethylene terephthalate and polycaprolactone respectively. The polybutylene terephthalate used was Valox® polybutylene terephthalate, melting point 229° C., commercially available from General Electric. The polyethylene terephthalate used is commercially available from Celanese under the tradename Celanex 2113® polyethylene terephthalate and has a melting point of 257° C. The polycaprolactone used is commercially available from Union Carbide under the tradename P-300® polycaprolactone.

The blends were prepared in a 15 mm twin screw Baker Perkins extruder with a residence time of 0.5 minutes at a temperature of 280°. The resulting blends had a uniform appearance. The polyesters existed as a discrete phase in the polyetone matrix with a phase size on the order of about 0.5 microns to about 4 microns. The phase sizes for the three blends are given in Table I.

TABLE I

| SAMPLE | % w Polyketone[a] | % w Polyester | Polyester | Phase Size ($\mu$) |
|---|---|---|---|---|
| A | 90 | 10 | PBT[b] | 0.7 |
| B | 90 | 10 | PET[c] | 1.0 |
| C | 90 | 10 | Poly-caprolactone | 3.5 |

[a]Linear alternating terpolymer of carbon monoxide, ethylene and propylene. Melting point 221° C. and LVN of 1.2 at 60° in m-cresol.
[b]Polybutylene terephthalate.
[c]Polyethylene terephthalate.

ILLUSTRATIVE EMBODIMENT III

Measurement of melting points and crystallization temperatures, or alternatively heats of melting and heats of fusion, were made by the use of a Perkin-Elmer DCS 7 differential scanning calorimeter (DCS) which employs samples of polymer or polymer blend in sealed pan containers. The pan and contents are heated at a controlled rate, typically 20° C./minute, until the sample has melted. The pan and contents are then cooled until the sample has solidified and then heated, past a second melting point, to 285° C. at which temperature the sample is maintained for 10 minutes. The pan and contents are then cooled until the sample has solidified a second time. The melting and crystallization temperatures of the polyketone component are defined as the temperatures at which the differential heat flow reaches a maximum for melting or a minimum for crystallization. Typically the melting point, Tm, will be higher than the crystallization temperature, Tc. It is also possible to determine through the use of the DSC the magnitude of the first and second heats of melting ($H_1$ and $H_2$) and the first and second heats of crystallization ($C_1$ and $C_2$) for the polymer or the polyketone component of the polymer blend. The values for the heat of crystallization will generally decrease upon repeated melting/solidification cycles as the apparent crystallinity of the sample decreases. The higher the heat of crystallization, the higher the degree of retained crystallinity and the greater the melt stability of the polymer or blend.

These values are reported in Table II for the terpolymer of Illustrative Embodiment I for the blended compositions of Illustrative Embodiment II. One can see, for example, that the 10% by weight PBT blend shows an increased melting temperature and slightly increased heat of fusion in comparison to terpolymer alone.

The temperatures reported in Table II were measured in °C. and heats were measured in cal/g.

TABLE II

| SAMPLE | [a] POLYESTER | TM1 | TC1 | TM2 | TC2 | $H_1$ | $C_1$ | $H_2$ | $C_2$ |
|---|---|---|---|---|---|---|---|---|---|
| CONTROL | None | 230.1 | 183.9 | 224.2 | 170.8 | 22.3 | 17.2 | 18.5 | 13.4 |
| A | 10.5% w PBT | 236.3 | 179.3 | 225.0 | 144.1 | 23.6 | 18.4 | 18.5 | 9.25 |
| B | 10.7% w PET | 239.3 | 183.8 | 224.4 | 156.9 | 17.28 | 16.8 | 19.4* | 12.0 |
| C | 9.4% w Poly-caprolactone | 238.9 | 177.7 | 227.6 | 157.0 | 20.0 | 16.3 | 16.0 | 13.4 |

[a]Based on total weight of blend.
*This value appears to be an experimental anomaly.

What is claimed is:

1. A polymeric composition comprising a blend of a linear alternating polymer of carbon monoxide and at least one ethylenically unsaturated hydrocarbon with a thermoplastic polyester selected from the group consisting of (a) polyesters formed by the polycondensation of a dicarboxylic acid with a glycol or (b) polylactones.

2. The composition of claim 1 wherein the ethylenically unsaturated hydrocarbon is an alpha-olefin having from 2 to twelve carbon atoms.

3. The composition of claim 1 wherein the ethylenically unsaturated hydrocarbon is ethylene.

4. The composition of claim 1 wherein the polyester has a structure formed by polycondensation of a dicarboxylic acid with glycol.

5. The composition of claim 4 wherein the polyester is a poly(alkylene arylate).

6. The composition of claim 5 wherein the poly(alkylene arylate) is poly(alkylene terephthalate).

7. The composition of claim 6 wherein the poly(alkylene terephthlate) is selected from the group consisting of polyethylene terephthalate, polypropylene terephthalate and polybutylene terephthalate.

8. The composition of claim 1 wherein the polyester is a polylactone.

9. The composition of claim 8 wherein the polylactone is selected from the group consisting of polypivalolactone, poly($\beta$-propiolactone) and poly($\epsilon$-caprolactone).

10. A polymeric composition comprising a blend of a linear alternating polymer of the formula

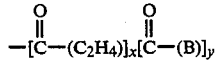

wherein B is the moiety of an ethylenically unsaturated hydrocarbon of at least three carbon atoms and the ratio of y:x is no more than about 0.5 with a quantity from about 2% by weight to about 40% by weight, based on the total blend, of a thermoplastic polyester selected from the group consisting of (a) polyester formed by the polycondensation of a dicarboxylic acid with a glycol or (b) polylactones.

11. The composition of claim 10 wherein the polyester has a structure formed by polycondensation of a dicarboxylic acid with a glycol.

12. The composition of claim 11 wherein the polyester is a poly(alkylene terephthalate).

13. The composition of claim 12 wherein the poly(alkylene terephthalate) has the general formula

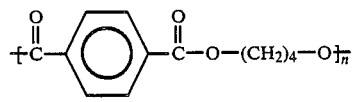

wherein n is from 70 to about 140.

14. The composition of claim 12 wherein the poly(alkylene terephthlate) is selected from the group consisting of polyethylene terephthalate, polypropylene terephthalate and polybutylene terephthalate.

15. The composition of claim 10 wherein the polyester is a polylactone.

16. The composition of claim 15 wherein the polylactone is selected from the group consisting of polypivalolactone, poly($\beta$-propiolactone) and poly($\epsilon$-caprolactone).

17. The composition of claim 10 wherein y=0.

18. The composition of claim 10 wherein B is the moiety of propylene.

19. The composition of claim 18 wherein the polyester is present in an amount from about 5% by weight to about 25% by weight, based on total composition.

20. As an article of manufacture, a molded article, comprising the composition of claim 10.

* * * * *